United States Patent [19]

Krakowitzer

[11] Patent Number: 5,737,912
[45] Date of Patent: Apr. 14, 1998

[54] METHOD FOR STARTING GAS TURBINE IN COMBINED CYCLE POWER STATION

[75] Inventor: Wilhelm Krakowitzer, Wettingen, Switzerland

[73] Assignee: Asea Brown Boveri AG, Baden, Switzerland

[21] Appl. No.: 711,647

[22] Filed: Sep. 10, 1996

[30] Foreign Application Priority Data

Oct. 10, 1995 [DE] Germany ............ 195 37 637.4

[51] Int. Cl.$^6$ .............................. F02C 6/18; F02C 7/268
[52] U.S. Cl. ................... 60/39.04; 60/39.142; 60/39.182
[58] Field of Search ........................ 60/39.04, 39.142, 60/39.17, 39.182; 122/7 B

[56] References Cited

U.S. PATENT DOCUMENTS

| | | | |
|---|---|---|---|
| 4,519,207 | 5/1985 | Okabe et al. | 60/39.182 |
| 5,042,246 | 8/1991 | Moore et al. | 60/39.03 |
| 5,203,160 | 4/1993 | Ozono | 60/39.142 |
| 5,577,378 | 11/1996 | Althaus | 60/39.17 |

FOREIGN PATENT DOCUMENTS

| | | |
|---|---|---|
| 0321809A1 | 6/1989 | European Pat. Off. . |
| 0439754A1 | 8/1991 | European Pat. Off. . |
| WO93/10335 | 5/1993 | WIPO . |

*Primary Examiner*—Louis J. Casaregola
*Attorney, Agent, or Firm*—Burns, Doane, Swecker & Mathis, L.L.P.

[57] ABSTRACT

In a method for operating a power station which consists essentially of a gas turbine group, of a waste-heat steam generator (20), of an intermediate superheater (22) and of a steam circuit with a steam turbine (14), a first steam quantity (28) is initially formed in the waste-heat steam generator (20) from the operation of the intermediate superheater (22) and is used for charging the steam turbine (14). The power resulting from this is transferred directly or indirectly into the gas turbine group and serves there as startup power for putting the gas turbine group into operation.

5 Claims, 1 Drawing Sheet

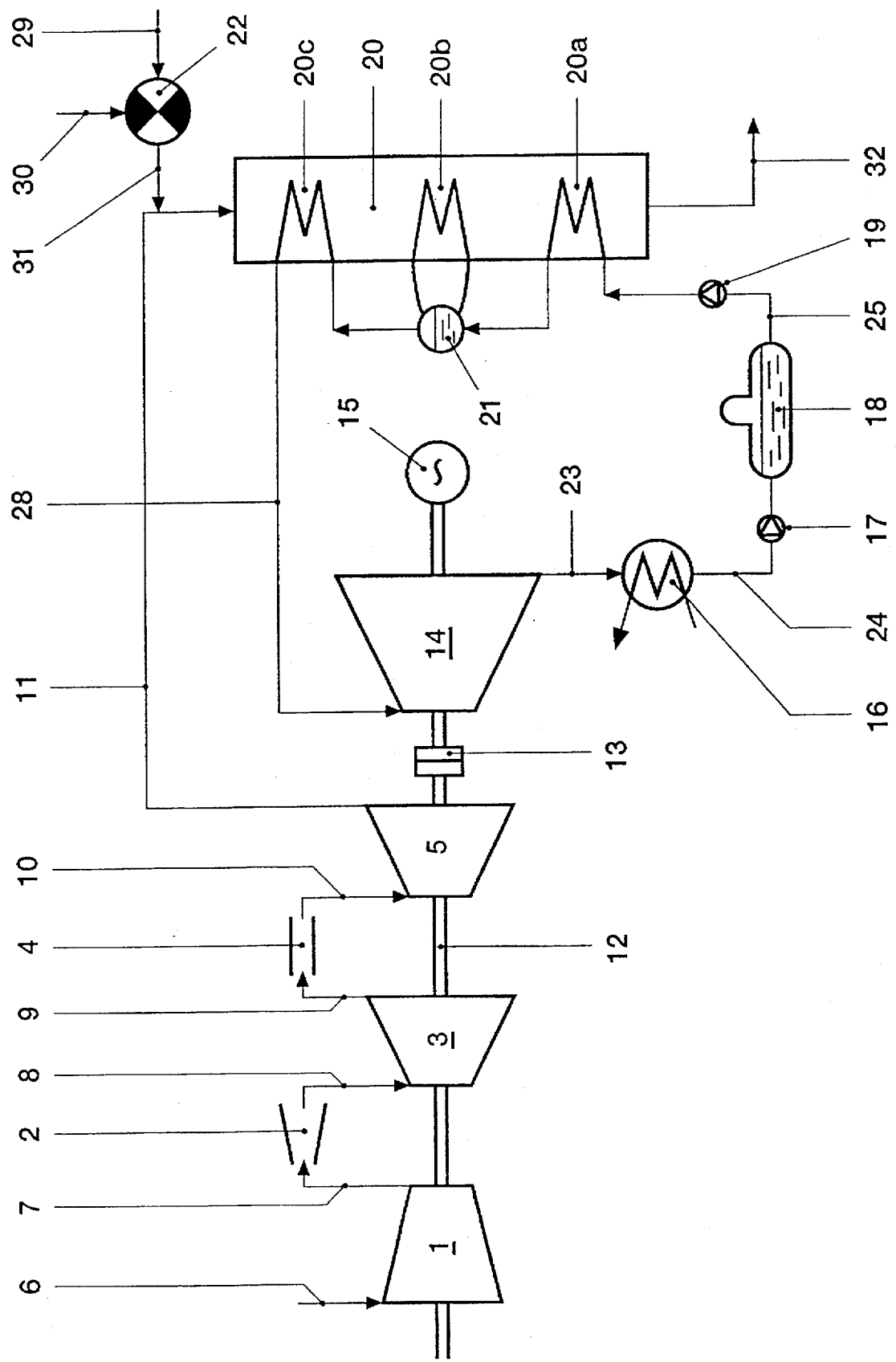

METHOD FOR STARTING GAS TURBINE IN COMBINED CYCLE POWER STATION

BACKGROUND OF THE INVENTION

1. Field of the Invention

The present invention relates to a method for operating a power station according to the preamble of claim 1.

2. Discussion of Background

In power stations equipped with a gas turbine group, the startup (black start) of the latter may present some difficulties for logistic reasons regarding the provision of the necessary current. This is the case whenever the station is operated in the island mode and therefore is to be started up within this infrastructure. In such stations, therefore, it is important and obvious that the startup does not demand too much electrical power, since this could initially be furnished only via an independent additional current generating machine. If the gas turbine group is small or of medium size, the startup power required for this purpose can easily be provided by conventional current-generating auxiliary assemblies. However, as soon as larger gas turbine groups have to be started up, the startup powers necessary for this increase rapidly, in such a way that it is necessary to provide auxiliary assemblies, the cost of which may easily be disproportionate to the investment costs of the power station as a whole.

Even if the gas turbine group can procure the startup power necessary for this purpose via a connected current supply, even here there is still the risk that such a peak cannot be absorbed directly by the electricity network. Furthermore with regard to gas turbine groups of the more recent generation, which, on the one hand, are characterized by specific powers above and beyond 150 MWe and, on the other hand, have sequential combustion with a unitary rotor shaft, the startup powers necessary for this purpose are high, easily of the order of magnitude of 15 MVA. In view of this initial situation, therefore, the acceptance of such stations depends not least on the existing electrical infrastructure. If there is no or insufficient infrastructure, the commercial possibilities of such stations for the moment remain restricted. Startup from standstill, for example by providing the startup power via diesel-driven motors, is of no use in economic terms.

SUMMARY OF THE INVENTION

The invention intends to remedy this. Accordingly, one object of the invention, as defined in the claims, in a method of the type initially mentioned, is to provide self-sufficient solutions which can provide a startup power necessary for putting a gas turbine group into operation.

The essential advantage of the invention is to be seen in that steam generation provided in connection with the gas turbine group is utilized directly or indirectly within the power station for starting up the gas turbine group. It must be assumed, here, that, nowadays, pure gas turbine groups, in which the potential of the exhaust gases from the last turbine remains unused, that is to say the exhaust gases are routed into the chimney, are no longer being commissioned.

Either these high-performance gas turbines are operated as combination plants or the utilization of the thermal potential of these very exhaust gases downstream of the gas turbine group provides steam generation, the steam of which is employed, for example, for purposes of cooling the assemblies experiencing thermal stress and/or for increasing the specific power of the gas turbine group. Furthermore, for the implementation of the invention, use is made of the possibility that the waste-heat steam generators are nowadays in any case occasionally equipped with additional firing.

This initial situation thus affords the possibility of providing the startup power by means of a first steam quantity. The simplest circuit for this purpose is provided when the power station is designed as a combination plant, since a steam turbine is in operation here in any case. That first steam quantity which is employed for charging the steam turbine can first be generated here via the additional firing of the waste-heat steam generator. The gas turbine group can be started up by means of a direct mechanical drive or via the electrical power which occurs. The procedure is similar when, although there is no waste-heat steam generator, instead the infrastructure is available for further steam generation, and, in the last-mentioned case, the steam turbine, which is then likewise necessary, can be designed according to the minimum startup power required.

Advantageous and expedient developments of the solution according to the invention are defined in the further claims.

An exemplary embodiment of the invention is explained in more detail below with reference to the drawing. All the features not necessary for the direct understanding of the invention have been omitted. The direction of flow of the media is indicated by arrows.

BRIEF DESCRIPTION OF THE DRAWING

A more complete appreciation of the invention and many of the attendant advantageous thereof will be readily obtained as the same becomes better understood by reference to the following detailed description when considered in connection with the accompanying drawing, wherein the single FIGURE shows the circuit of a combination plant, the operation of which is extended to the provision of the startup power necessary for starting the gas turbine group.

DESCRIPTION OF THE PREFERRED EMBODIMENTS

Referring now to the drawing, the FIGURE shows a combination plant which consists of a gas turbine, of a waste-heat steam generator located downstream of the gas turbine, of a steam turbine capable of being operated by means of the steam from the waste-heat steam generator and of at least one electric machine.

The present gas turbine group is based on sequential combustion. The provision of the fuel necessary for operating the various combustion chambers, said provision not being evident from the FIGURE, can be brought about, for example, by coal gasification cooperating with the gas turbine group. It is also possible, of course, to procure the fuel used from a primary network. If the supply of a gaseous fuel for operating the gas turbine group is provided via a pipeline, the potential arising from the pressure difference and/or temperature difference between the primary network and consumer network can be recuperated for the requirements of the gas turbine group or, in general, of the circuit. The present gas turbine group, considered as an independent unit, consists of a compressor 1, of a first combustion chamber 2 located downstream of the compressor, of a first turbine 3 located downstream of this combustion chamber 2, of a second combustion chamber 4 located downstream of this turbine 3 and of a second turbine 5 located downstream of this combustion chamber 4. Said turbomachines 1, 3, 5 have a unitary rotor shaft 12. This rotor shaft 12 itself is preferably mounted on two bearings, not evident in the FIGURE, which are placed on the head side of the compressor 1 and downstream of the second turbine 5. The compressor 1 can be subdivided into two part compressors (not shown), depending on its design, for example in order to increase the specific power. With such a configuration, an intermediate cooler is connected downstream of the first compressor and upstream of the second compressor, the partly compressed air being intermediately cooled in said intermediate cooler. The heat occurring in this intermediate cooler, likewise not shown, is returned optimally, that is to say profitably, into the process. The sucked-in air 6 flows as compressed air 7 into a housing, not shown in more detail, which encloses in itself the compressor outlet and the first turbine 3. Also accommodated in this housing is the first combustion chamber 2 which is preferably designed as a continuous annular combustion chamber. Of course, the compressed air 7 of the first combustion chamber 2 can be provided from an air storage system (not shown). The annular combustion chamber 2 has on the head side, distributed over the circumference, a number of burners, not shown in more detail, which are preferably designed as premixing burners. Diffusion burners can also be used here per se. However, with the aim of reducing the emissions of harmful substances from this combustion, particularly as regards NOx emissions, it is advantageous to provide an arrangement of premixing burners according to EP-A1-0, 321,809, the subject of the invention from said publication being an integral part of this description, as is also, furthermore, the type of fuel supply described there. As regards the arrangement of the premixing burners in the circumferential direction of the annular combustion chamber 2, said arrangement may, if required, deviate from the conventional configuration of identical burners, and instead premixing burners of differing size can be employed. This takes place preferably in that a small premixing burner of identical configuration is arranged in each case between two large premixing burners. In respect of the burner air flowing through them, that is to say the compressed air from the compressor 1, the large premixing burners, which have to perform the function of main burners, are to the small premixing burners, which are the pilot burners of this combustion chamber, in a size ratio which is determined in each particular case. In the entire load range of the combustion chamber, the pilot burners work as independent premixing burners, the air coefficient remaining virtually constant. The cut-in or cutout of the main burners takes place according to particular plant-specific prerequisites. Since the pilot burners can be operated with an ideal mixture in the entire load range, the NOx emissions are very low even under part load. In such a configuration, the circulating flow lines in the front region of the annular combustion chamber 2 come very near to the vortex centers of the pilot burners, so that ignition is possible per se only by means of these pilot burners. During runup, the fuel quantity supplied by the pilot burners is increased until these are activated, that is to say until the full fuel quantity is available. Configuration is selected in such a way that this point corresponds to the respective load release conditions of the gas turbine group. The further power increase then takes place via the main burners. At the peak load of the gas turbine group, therefore, the main burners too are fully activated. Since the configuration, initiated by the pilot burners, of "small" hot vortex centers between the "large" cooler vortex centers originating from the main burners is extremely unstable, a very good burnout with low CO and UHC emissions in addition to the NOx emissions is achieved in the part load range, even when the main burners are operated under lean conditions, that is to say the hot vortices of the pilot burners penetrate immediately into the small vortices of the main burners. Of course, the annular combustion chamber can consist of a number of individual tubular combustion spaces which are arranged likewise in the form of an oblique ring, sometimes also helically, around the rotor axis. This annular combustion chamber 2, irrespective of its design, is and can be arranged geometrically in such a way that it exerts virtually no influence on the rotor length. The hot gases 8 from this annular combustion chamber 2 charge the directly downstream first turbine 3, of which thermally expanding effect on the hot gases is deliberately kept to a minimum, that is to say this turbine 4 will accordingly consist of no more than two rows of moving blades. In such a turbine 3, it will be necessary to provide pressure equalization on the end faces for the purpose of stabilizing the axial thrust. For the reasons given, the hot gases 9, which are partly expanded in the turbine 3 and which flow directly into the second combustion chamber 4, have a very high temperature, and it must preferably be designed for specific operating conditions, in such a way that it still reliably amounts to around 1000° C. This second combustion chamber 4 has essentially the shape of a continuous annular axial or quasi-axial cylinder. This combustion chamber 4 can, of course, also consist of a number of self-contained combustion spaces arranged axially, quasi-axially or helically. As regards the configuration of the annular combustion chamber 4 consisting of a single combustion space, a plurality of fuel lances, not shown in more detail in the FIGURE, are arranged in the circumferential direction and radially of this annular cylinder. This combustion chamber 4 has no burner: the combustion of the fuel injected into the partly expanded hot gases 9, coming from the turbine 3, takes place, here, by autoignition, admittedly insofar as the temperature level allows such a mode of operation. Assuming that the combustion chamber 4 is operated with a gaseous fuel, that is to say, for example, natural gas, a temperature of the partly expanded hot gases 9 from the turbine 3 of around 1000° C. must be present for autoignition. Accordingly, in order to ensure autoignition of a natural gas in the combustion chamber 4, the outlet temperature of the partly expanded hot gases 9 from the turbine 3 must also be very high, around 1000° C. as stated above, this of course also pertaining in the part load mode, this having an influence on the design of this turbine 2. In order to guarantee operating reliability and high efficiency in the case of a combustion chamber designed for autoignition, it is of the utmost importance that the flame front should remain in a stable location. For this purpose, a series of elements, not shown in more detail, is provided in this combustion chamber 4, said elements preferably being arranged in the circumferential direction on the inner and outer wall and being placed preferably upstream of the fuel lances in the axial direction. The function of these elements is to generate vortices which induce a backflow zone similar to that in the premixing burners already mentioned. Since this combustion chamber 4, on account of the axial arrangement and overall length, is a high-velocity combustion chamber, in which the mean velocity of the working gases is higher than approximately 60 m/s, the vortex-generating elements must have a design in conformity with the flow. On the onflow side, these are preferably to consist of a tetrahedral shape with faces skew to the onflow. The vortex-generating elements can be placed either on the outer face and/or on the inner face. Of course, the vortex-generating elements can also be displaced axially relative to one another. The off-flow face of the vortex-generating elements is designed essentially radially, so that a backflow zone is established from that point. However, autoignition in the combustion chamber 4 must also remain safeguarded in the transient load ranges and in the part load range of the gas turbine group, that is to say it is necessary to provide auxiliary measures which ensure autoignition in the combustion chamber 4 even if a flexion of the temperature of the gases were to occur in the region of the injection of the fuel. In order to guarantee reliable autoignition of the gaseous fuel injected into the combustion chamber 4, said fuel has added to it a small quantity of another fuel with a lower ignition temperature. Fuel oil is highly suitable here as an example of an "auxiliary fuel". The liquid auxiliary fuel, appropriately injected, performs the function of acting as it were as a detonating fuse and allows autoignition in the combustion chamber 4 even if the partly expanded hot gases 9 from the first turbine 3 were to have a temperature below the desired optimum level of 1000° C. This measure of providing fuel oil for ensuring autoignition certainly proves to be particularly expedient whenever the gas turbine group is operated at reduced load. Furthermore, this measure contributes decisively to ensuring that the combustion chamber 4 can have a minimum axial length. The short overall length of the combustion chamber 4, the effect of the vortex-generating elements for flame stabilization and the constant assurance of autoignition are therefore responsible for the fact that combustion takes place very rapidly and the dwell time of the fuel in the region of the hot flame front remains minimal. An effect arising from this, which can be measured directly in specific relation to combustion, regards the NOx emissions which experience minimization such that they are now no longer of any interest. Furthermore, this initial situation makes it possible to define the location of combustion clearly, which has an effect on an optimized cooling of the structures of this combustion chamber 4. The hot gases 10 treated in the combustion chamber 4 subsequently charge a downstream second turbine 5. The thermodynamic characteristic values of the gas turbine group can be rated in such a way that the exhaust gases 11 from the second turbine 5 still have enough thermal potential to operate the steam circuit, shown here, by means of them. As was already pointed out in the description of the annular combustion chamber 2, the latter is arranged geometrically in such a way that it exerts virtually no influence on the rotor length of the gas turbine group. Furthermore, it can be established that the second combustion chamber 4 extending between the off-flow plane of the first turbine 3 and onflow plane of the second turbine 5 has a minimal length. Moreover, since the expansion of the hot gases in the first turbine 3 takes place via only a few rows of moving blades for reasons stated, it is possible to provide a gas turbine group, the rotor shaft 12 of which can be supported in a technically satisfactory manner on two bearings on account of its minimized length. On the turbine side 5, the rotor shaft 12 has a coupling 13 which couples a steam turbine 14 to the gas turbine group. The power output of the turbomachines takes place via a coupled generator 15 which can also serve as a starting motor. After expansion in the turbine 5, the exhaust gases 11, which still have high thermal potential, flow through a waste-heat steam generator 20 which, by the heat exchange method, generates steam 28 which then forms the working medium of the downstream steam circuit. The thermally utilized exhaust gases subsequently flow into the open as flue gases 32. The waste-heat steam generator 20 shown here is a single-pressure version with a drum 21. Of course, multi-pressure waste-heat steam generators can also be provided. A high-pressure steam 28 is generated via an economizer 20a, a low-pressure steam stage 20b and a superheater steam stage 20c, which are operatively connected to said drum 21, and then charges the steam turbine 14. The expanded steam 23 is condensed in a water-cooled or air-cooled condenser 16. By means of a condensate pump 17 acting downstream of this condenser 16, the condensate 24 is fed into a feed water tank and deaerator 18. A further feed pump 19 acting downstream then pumps the water 25 into the economizer 20a of the waste-heat steam generator 20, as a result of which the circuit can commence again. The waste-heat steam generator 20 is extended by means of an intermediate superheater 22 which is operated either in cooperation with the relevant waste-heat steam generator 20 or independently. The FIGURE shows the last-mentioned possibility: the combustion air 29 is mixed with a fuel 30, and the hot gases 31 formed from the subsequent combustion are routed into the waste-heat steam generator 20, in which the steam generation already described takes place. If the plant, that is to say the gas turbine group, is to be put into operation from a standstill, the intermediate superheater 22 is ignited. The steam quantity formed via the circuit already evaluated charges the steam turbine 14 which furnishes the startup power for the gas turbine group coupled to it. As soon as the steam 28 formed by the exhaust gases 11 from the turbine 5 makes it possible for the putting into operation of the gas turbine group to be maintained, the intermediate superheater 22 can be shut down. If, for any reason, there is no coupling between the gas turbine group and steam turbine 14, the current generated by means of the first steam quantity in the steam turbine 14 is used for starting up the gas turbine group, in such a case an additional electric machine being necessary for this purpose.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A method for operating a power station including a gas turbine group, a steam circuit and a steam turbine, the method comprising the steps of:

forming a portion of hot gas in an additional firing in connection with a waste-heat steam generator belonging to the steam circuit;

routing the portion of hot gas through the waste-heat steam generator for generating a portion of a first steam quantity;

charging the steam turbine with the portion of the first steam quantity formed in the waste-heat steam generator; and transferring power resulting from said charging of the steam turbine into the gas turbine group for the purpose of furnishing the necessary start-up power.

2. The method as claimed in claim 1, wherein the additional firing ignites a superheater that forms the portion of hot gas.

3. The method as claimed in claim 1, wherein the transfer of the startup power from the steam turbine into the gas turbine group is carried out by coupling the steam turbine to a rotor shaft belonging to the gas turbine group.

4. The method as claimed in claim 1, wherein, in the event of an independent operation of the steam turbine (14) dissociated from the gas turbine group, the current formed by the first steam quantity (28) in a generator (15) belonging to the steam turbine (14) is transferred for the purpose of driving an electric machine belonging to the gas turbine group.

5. The method as claimed in claim 1, wherein the gas turbine group is operated by sequential combustion in that said gas turbine group includes a plurality of sequentially arranged turbines, combustion gases from a first one of said plurality of turbines charging a next sequential one of said plurality of turbines.

* * * * *